US012708200B2

(12) United States Patent
Minami et al.

(10) Patent No.: US 12,708,200 B2
(45) Date of Patent: Aug. 18, 2026

(54) ASSEMBLY TYPE FIXTURE AND ASSEMBLING PART OF ASSEMBLY TYPE FIXTURE

(71) Applicant: Okamura Corporation, Kanagawa (JP)

(72) Inventors: Hideaki Minami, Kanagawa (JP); Yoshinobu Hirose, Kanagawa (JP); Jyunpei Akimoto, Kanagawa (JP); Masaharu Suga, Kanagawa (JP)

(73) Assignee: OKAMURA CORPORATION, Kanagawa (JP)

( * ) Notice: Subject to any disclaimer, the term of this patent is extended or adjusted under 35 U.S.C. 154(b) by 0 days.

(21) Appl. No.: 18/952,882

(22) Filed: Nov. 19, 2024

(65) Prior Publication Data

US 2025/0160514 A1 May 22, 2025

(30) Foreign Application Priority Data

Nov. 21, 2023 (JP) ................................ 2023-197115

(51) Int. Cl.
*A47B 47/02* (2006.01)
*A47B 57/40* (2006.01)
*B60B 33/00* (2006.01)

(52) U.S. Cl.
CPC .......... *A47B 47/022* (2013.01); *A47B 57/406* (2013.01); *B60B 33/0005* (2013.01); *B60B 2200/20* (2013.01)

(58) Field of Classification Search
CPC . A47B 47/022; A47B 57/406; B60B 33/0005; B60B 2200/20; F16B 2012/443; F16B 12/48; F16B 12/52
See application file for complete search history.

(56) References Cited

U.S. PATENT DOCUMENTS 2,654,487 A * 10/1953 Degener ............ A47B 87/0215 211/188
3,186,363 A * 6/1965 Moore ................. A47B 47/022 211/187
3,297,374 A * 1/1967 Radek ..................... A47F 5/103 312/334.47
3,642,310 A * 2/1972 Hudson ................ H02G 3/0608 160/381

(Continued)

FOREIGN PATENT DOCUMENTS

DE 2135749 A1 * 1/1972
DE 9200696 U1 * 5/1992

(Continued)

*Primary Examiner* — Stanton L Krycinski
(74) *Attorney, Agent, or Firm* — HAYES SOLOWAY P.C.

(57) ABSTRACT

Disclosed is an assembly type fixture whose assembling is easy and convenient, and an assembling part of an assembly type fixture. A square pipe having an insertion hole in a front surface plate, and a coupling member having an engagement element that is inserted into the square pipe from an end opening of the square pipe are provided, the engagement element has a pair of long side plate and short side plate that oppose each other and have different front-to-rear lengths from each other, and an intermediate plate that connects the long side plate and the short side plate, and is abutted with and arranged on an inner surface of the square pipe, and the insertion hole is arranged close to the short side plate side.

11 Claims, 10 Drawing Sheets

(56) References Cited

U.S. PATENT DOCUMENTS

| | | | | |
|---|---|---|---|---|
| 4,126,288 | A * | 11/1978 | De Sisto | F16B 7/0446 248/165 |
| 4,380,298 | A * | 4/1983 | Harig | F16B 2/241 403/245 |
| 4,516,376 | A * | 5/1985 | King | F16B 12/36 403/171 |
| 5,255,803 | A * | 10/1993 | Pavone | A47F 5/00 248/220.21 |
| 5,997,117 | A * | 12/1999 | Krietzman | H02B 1/301 403/219 |
| 6,164,467 | A * | 12/2000 | DePottey | A47F 5/0846 52/36.5 |
| 6,739,463 | B2 * | 5/2004 | Wishart | A47B 96/1441 211/175 |
| 6,959,824 | B1 * | 11/2005 | Alperson | A47F 5/137 211/1.3 |
| D547,976 | S * | 8/2007 | Torrente Bonatti | D8/349 |
| 7,270,242 | B2 * | 9/2007 | Liu | A47B 47/024 248/188.8 |
| 7,448,634 | B1 * | 11/2008 | Raub | A47F 5/083 211/186 |
| 8,028,846 | B2 * | 10/2011 | Peota | F16B 12/50 211/187 |
| 8,613,365 | B2 * | 12/2013 | O'Quinn | A47B 96/1458 211/189 |
| 8,614,884 | B2 * | 12/2013 | Hsu | F16M 11/22 361/679.01 |
| 8,794,645 | B2 * | 8/2014 | Tang | F16M 11/22 348/836 |
| 8,959,813 | B2 * | 2/2015 | Denby | G09F 15/0068 40/606.03 |
| 9,562,643 | B2 * | 2/2017 | Liu | F16M 11/04 |
| 10,117,525 | B2 * | 11/2018 | LaMontagne | A47F 3/0469 |
| 10,154,227 | B2 * | 12/2018 | Ikemoto | H04N 5/44 |
| 10,640,968 | B2 * | 5/2020 | Teffenhart, Jr. | E04B 1/2403 |
| 10,781,838 | B2 * | 9/2020 | Koepke | F16B 7/0413 |
| 2002/0095890 | A1 * | 7/2002 | Brauning | A47B 57/06 52/239 |
| 2006/0208145 | A1 * | 9/2006 | Chen | F16M 11/046 248/289.11 |
| 2009/0095870 | A1 * | 4/2009 | Chang | F16M 11/22 248/440 |
| 2014/0294500 | A1 * | 10/2014 | Schaaf | H02B 1/301 403/403 |

FOREIGN PATENT DOCUMENTS

| | | | | |
|---|---|---|---|---|
| DE | 4403389 | A1 * | 8/1995 | A47G 1/101 |
| DE | 102007022054 | A1 * | 11/2008 | F16B 7/0453 |
| EP | 1288597 | A1 * | 3/2003 | A47F 3/0482 |
| GB | 2153955 | A * | 8/1985 | A47B 47/0008 |
| JP | 2001190371 | A | 7/2001 | |

* cited by examiner 51
52
55b
54
55c
56
55
5
55b
55a
55d
50a
50
UP
LEFT
RIGHT
DOWN
5
55c
55b
55a
55'
56'
53
51
54'
54
55
52
56
55a
55b
55c
50a
50

REAR
LEFT
RIGHT
FRONT

L1,L2
2a
55d
2r
2b
20a
57'
10
55a
2
55'
56'
2m
53
20
2g
51
L3,L4
REAR
55
52
LEFT
RIGHT
70a(60a)
56
57
55a
FRONT
2f
20a
2d
2c
55d
21
21a
70(60)
50
50a
5

54
55b
52(51)
10
20a
2
55a
56
55
50a
UP
20
LEFT
RIGHT
2j
2k
DOWN
50
5

ASSEMBLY TYPE FIXTURE AND ASSEMBLING PART OF ASSEMBLY TYPE FIXTURE

BACKGROUND OF THE INVENTION

Field of the Invention

The present invention relates to an assembly type fixture and an assembling part of an assembly type fixture.

Description of the Related Art

In a supermarket, a convenience store, an office, a library, a warehouse, etc., an assembly type fixture in which items are displayed on shelves, for example, is used.

For example, an assembly type fixture shown in Unexamined Japanese Patent Application Publication No. 2001-190371A includes a pair of right and left square-cylinder-shaped support posts, a lateral beam member, and leg members. A fitting hole for inserting the lateral beam member is formed on the lower side of an inside plate in the support post. Also, mating grooves with which the leg members are mated from the lower side are formed in lower ends of front and rear plates in the support post. It is possible to assemble the assembly type fixture by inserting the lateral beam member into the respective fitting hole of each support post, mating each leg member with the corresponding mating groove of the support post, and then coupling the lateral beam member and each leg member by a bolt and a nut.

In the assembly type fixture of Unexamined Japanese Patent Application Publication No. 2001-190371A, a large number of slit holes aligned in a row in the up and down direction are formed in each support post. Each slit hole is formed so that a hook in a bracket is insertable. By inserting the hook in the bracket into the slit hole and locking the hook onto the support post, the bracket is cantilevered by the support post. By supporting a shelf board by a pair of brackets cantilevered by the support posts, it is possible to configure a single shelf unit. Also, by changing a slit hole into which the hook in the bracket is inserted, it is possible to adjust a height position of the shelf unit.

In the assembly type fixture as in Unexamined Japanese Patent Application Publication No. 2001-190371A, position matching between the support posts in the front-to-rear direction and the up and down direction is performed by inserting the lateral beam member into each support post. Thus, assembling becomes easy and convenient.

Meanwhile, a nut is provided in a part of the lateral beam member, which is inserted in the support post. Also, a through hole through which a bolt is inserted is formed in the leg member. That is, in order to couple the lateral beam member and the leg member by the bolt and the nut, there is a need to perform position matching between the nut inserted into the support post, the nut being difficult to be visually recognized and the through hole in the leg member.

SUMMARY OF THE INVENTION

The present invention has been achieved focusing on such a problem, and an object of the present invention is to provide an assembly type fixture whose assembling is easy and convenient, and an assembling part of an assembly type fixture.

In order to solve the problem described above, an assembly type fixture according to a first aspect of the present invention includes a square pipe having an insertion hole at least in a front surface plate of the square pipe, and a coupling member having an engagement element that is inserted into the square pipe from an end opening of the square pipe, wherein the engagement element has a pair of long side plate and short side plate that oppose each other and have different front-to-rear lengths from each other, and an intermediate plate that connects the long side plate and the short side plate, and is abutted with and arranged on an inner surface of the square pipe, and the insertion hole is arranged close to the short side plate side. According to the fast aspect of the present invention, it is possible to couple the square pipe and the coupling member by an easy and convenient method of fitting the engagement element provided in the coupling member into the square pipe. In addition, it is possible to insert part of other members such as a bracket inserted from the insertion hole into the square pipe. Thus, it is possible to insert and remove other members through the insertion hole. Also, the short side plate does not easily contact with other members part of which are inserted from the insertion hole. Thus, insertion and removal of other members through the insertion hole become easy and convenient. Also, the short side plate is shorter than the long side plate and sufficiently shorter than a length of the end opening of the square pipe. Thus, the engagement element is easily fitted into the square pipe.

It may be preferable that the engagement element is abutted with at least one of a front inner surface and a rear inner surface of the square pipe. According to this preferable configuration, by ensuring a coupling strength in the front-to-rear direction of the square pipe and the coupling member, other members are stably easily attached from the front side.

It may be preferable that the engagement element is formed by fixing two constituent members each formed in a J-shape in a sectional view to each other back to back. According to this preferable configuration, it is possible not only to make manufacture of the engagement element easy and convenient, but also enhance a structural strength.

It may be preferable that the engagement element has a mating piece that projects to a square pipe side, and the square pipe may have a mated element with which the mating piece is mated. According to this preferable configuration, upon fitting the engagement element into the square pipe, by mating the mating piece of the engagement element with the mated element of the square pipe, it is possible to regulate the engagement element from getting out from the square pipe.

It may be preferable that the mating piece is provided at a position corresponding to a corner of the square pipe. According to this preferable configuration, it is possible to make an angle of inclination of the engagement element with respect to the square pipe smaller in a state where the square pipe and the engagement element are coupled to each other.

In order to solve the problem described above, an assembling part of an assembly type fixture according to the present invention includes a coupling member having an engagement element to be inserted into a square pipe from an end opening of the square pipe having an insertion hole at least in a front surface plate of the square pipe, wherein the engagement element has a pair of long side plate and short side plate to be abutted with an inner surface of the square pipe and an intermediate plate that connects the long side plate and the short side plate, and the long side plate and the short side plate oppose each other and have different front-to-rear lengths from each other. According to the second aspect of the present invention, it is possible to provide the assembling part capable of being coupled to the square pipe by an easy and convenient method of fitting the engagement element provided in the coupling member into the square pipe. Also, the short side plate does not easily contact with other members part of which are inserted from the insertion hole. Thus, insertion and removal of other members through the insertion hole become easy and convenient. Also, the short side plate is shorter than the long side plate and sufficiently shorter than a length of the end opening of the square pipe. Thus, the engagement element is easily fitted into the square pipe.

It may be preferable that the engagement element may be formed by fixing two constituent members each formed in a J-shape in a sectional view to each other back to back. According to this preferable configuration, it is possible not only to make manufacture of the engagement element easy and convenient, but also enhance a structural strength.

DESCRIPTION OF THE PREFERRED EMBODIMENTS

Modes for implementing an assembly type fixture and an assembling part of an assembly type fixture according to the present invention will be described based on embodiments.

First Embodiment

An assembly type fixture and an assembling part of an assembly type fixture according to a first embodiment of the present invention will be described with reference to FIGS. 1 to 9. Hereinafter, directions shown by arrows in the figures will be described as directions of the assembly type fixture.

Figure 1:
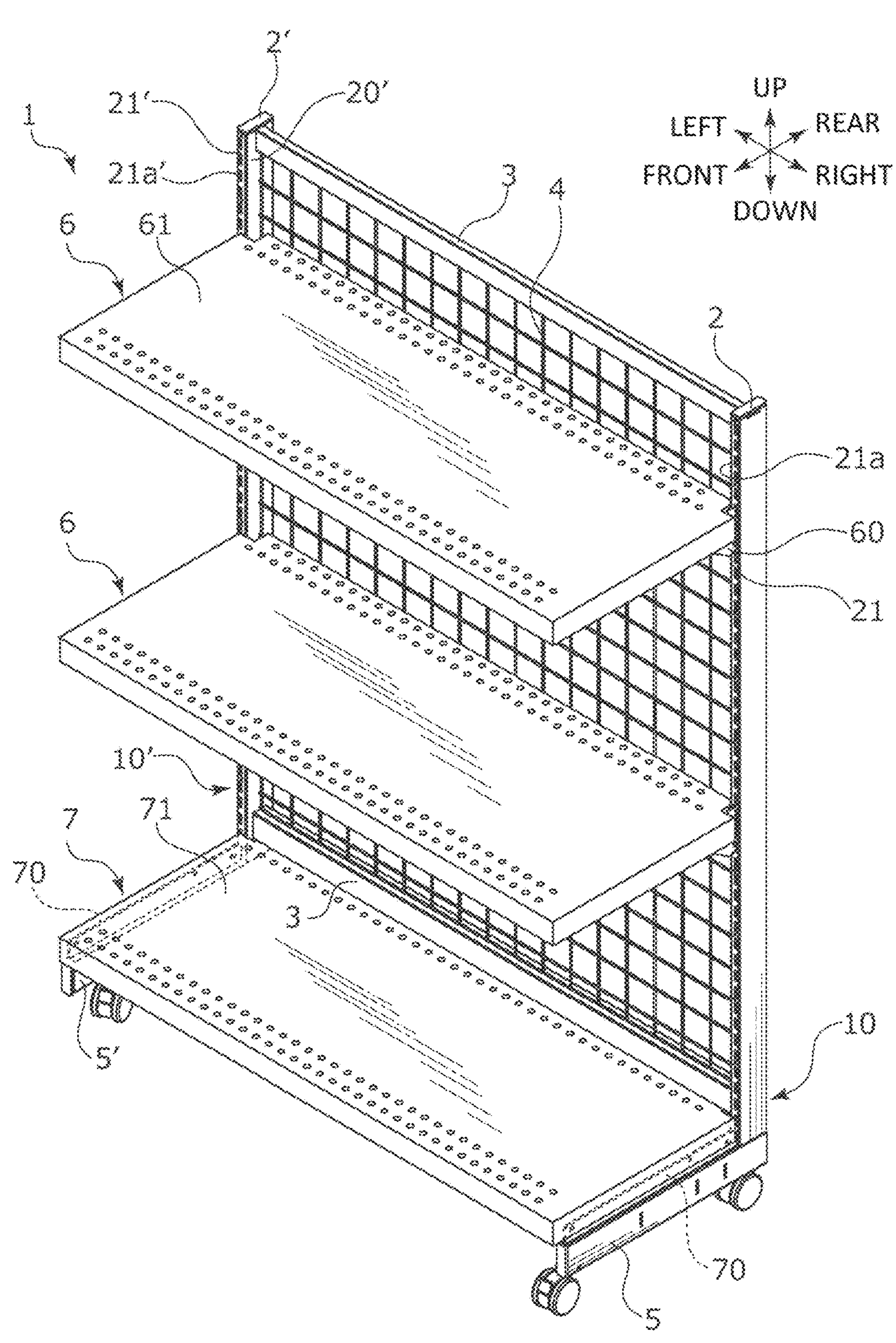
FIG. 1 is a perspective view of an assembly type fixture in a first embodiment according to the present invention.

As illustrated in FIG. 1, an assembly type fixture 1 in the first embodiment is product display shelves on which products are displayed in a supermarket, a convenience store, etc. It is noted that the assembly type fixture 1 is not limited to the product display shelves but may be item accommodation shelves on which items are accommodated in a warehouse, an office, etc.

The assembly type fixture 1 is mainly configured by support posts 2, 2' serving as square pipes provided in pairs on the right and left sides, lateral coupling rods 3, 3 provided in pairs on the upper and lower sides (see FIG. 1), a back surface panel 4 formed in a grid shape, leg materials 5, 5' serving as coupling members provided in pairs on the right and left sides, and three sets of shelf units 6, 6, 7. Hereinafter, the support posts 2, 2' and the leg materials 5, 51 coupled together will also be described as coupling structures 10, 10'.

The support post 2 and the support post 2' are formed in a symmetrical shape on the right and left sides. The support post 2 is arranged on the right side. The support post 2' is arranged on left side. Thus, the support post 2 on the right side will be exemplified and described, and a duplicated description regarding the support post 2' on the left side will be simplified or omitted. The same applies to the leg materials 5, 5' and the coupling structures 10, 10'. The leg material 5 on the right side and the coupling structure 10 on the right side will be exemplified and described, and a duplicated description regarding the leg material 5' on the left side and the coupling structure 10' on the left side will be simplified or omitted.

Figure 8:
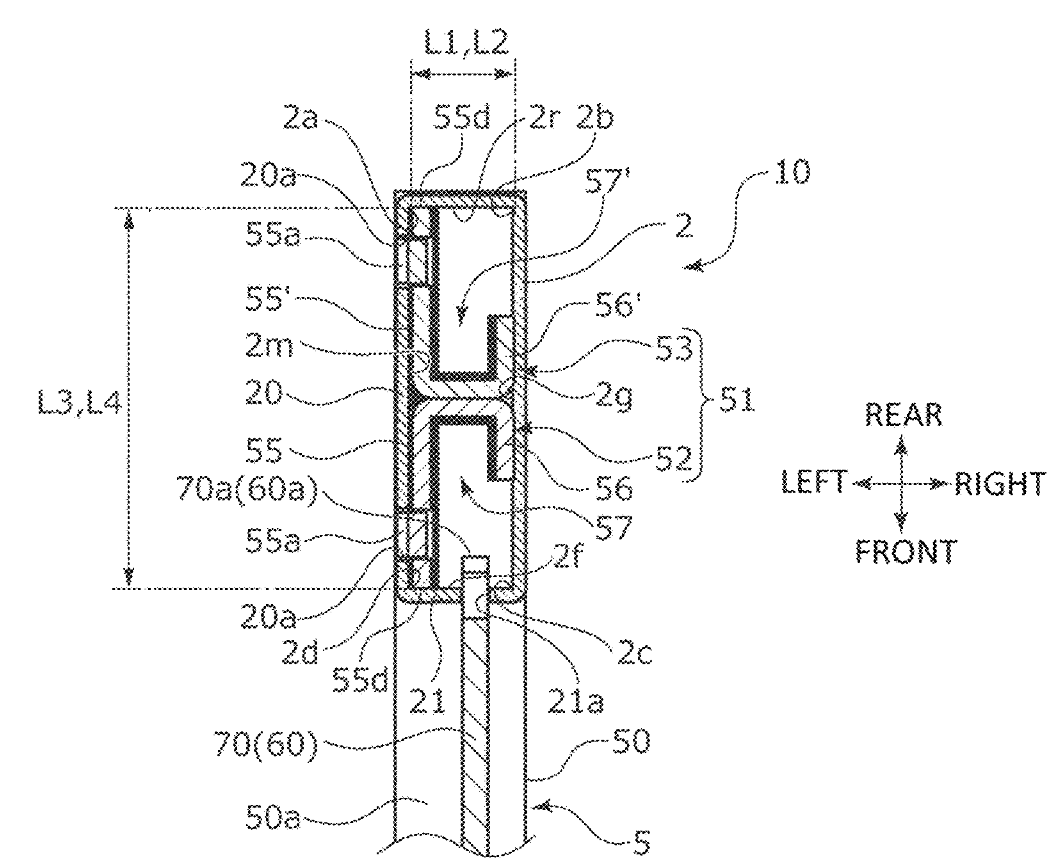
FIG. 8 is an upper surface view illustrating a broken part of the coupling structure in the first embodiment.

The support post 2 is made of metal and formed in a hollow square cylinder shape extending in the up and down direction (see FIG. 8).

In the support posts 2, 2', a left side plate 20 in the support post 2 (see FIG. 4) and a right side plate 20' in the support post 2' (see FIG. 1) opposing each other are coupled to each other by the lateral coupling rods 3, 3 on the upper and lower sides. The support posts 2, 2' configure a rectangular frame together with the lateral coupling rods 3, 3. The back surface panel 4 is fixed in this rectangular frame. The support posts 2, 2', the lateral coupling rods 3, 3, and the back surface panel 4 configure a single panel body. The panel body is provided to stand by the leg materials 5, 5' coupled by the support posts 2, 2'.

It is noted that a method of fixing the lateral coupling rod 3 to the support posts 2, 2' may be screwing, may be welding, may be engagement, or may be appropriately changed. The same applies to a method of fixing the back surface panel 4.

In the front surface plate 21 in the support post 2, a large number of insertion holes 21*a*, 21*a*, aligned in a row in the up and down direction are provided. The insertion holes 21*a*, 21*a*, are provided on the slightly right side of center in the right and left direction in the front surface plate 21 (see FIG. 8). In the front surface plate 21' in the support post 2', insertion holes 21*a'*, 21*a'*, . . . are provided on the slightly left side of center in the right and left direction.

The single shelf unit 6 includes a pair of right and left brackets 60, 60 and a shelf board 61. It is noted that for convenience of illustration, only the bracket 60 on the right side is illustrated and the bracket 60 on the left side is omitted.

A plurality of hooks 60*a* (see FIG. 8) formed in a downward-hook shape are provided in a rear end of the bracket 60. The hook 60*a* is inserted into the insertion hole 21*a* in the support post 2, and the bracket 60 is locked onto the front surface plate 21. That is, the bracket 60 is cantilevered by the support post 2.

Both right and left ends in the shelf board 61 are supported by the brackets 60, 60.

Figure 2:
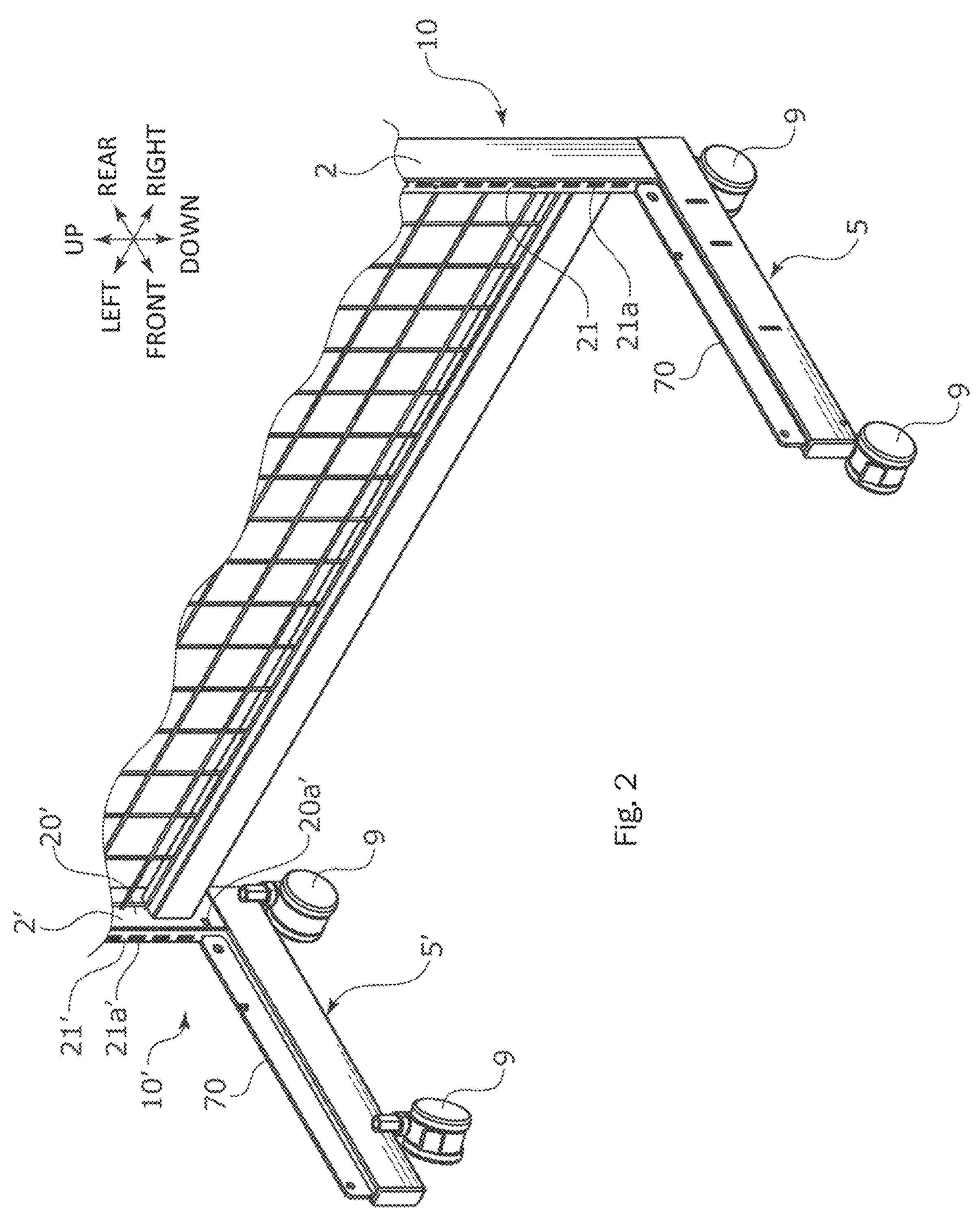
FIG. 2 is a perspective view of a coupling structure in the first embodiment.
Figure 3:
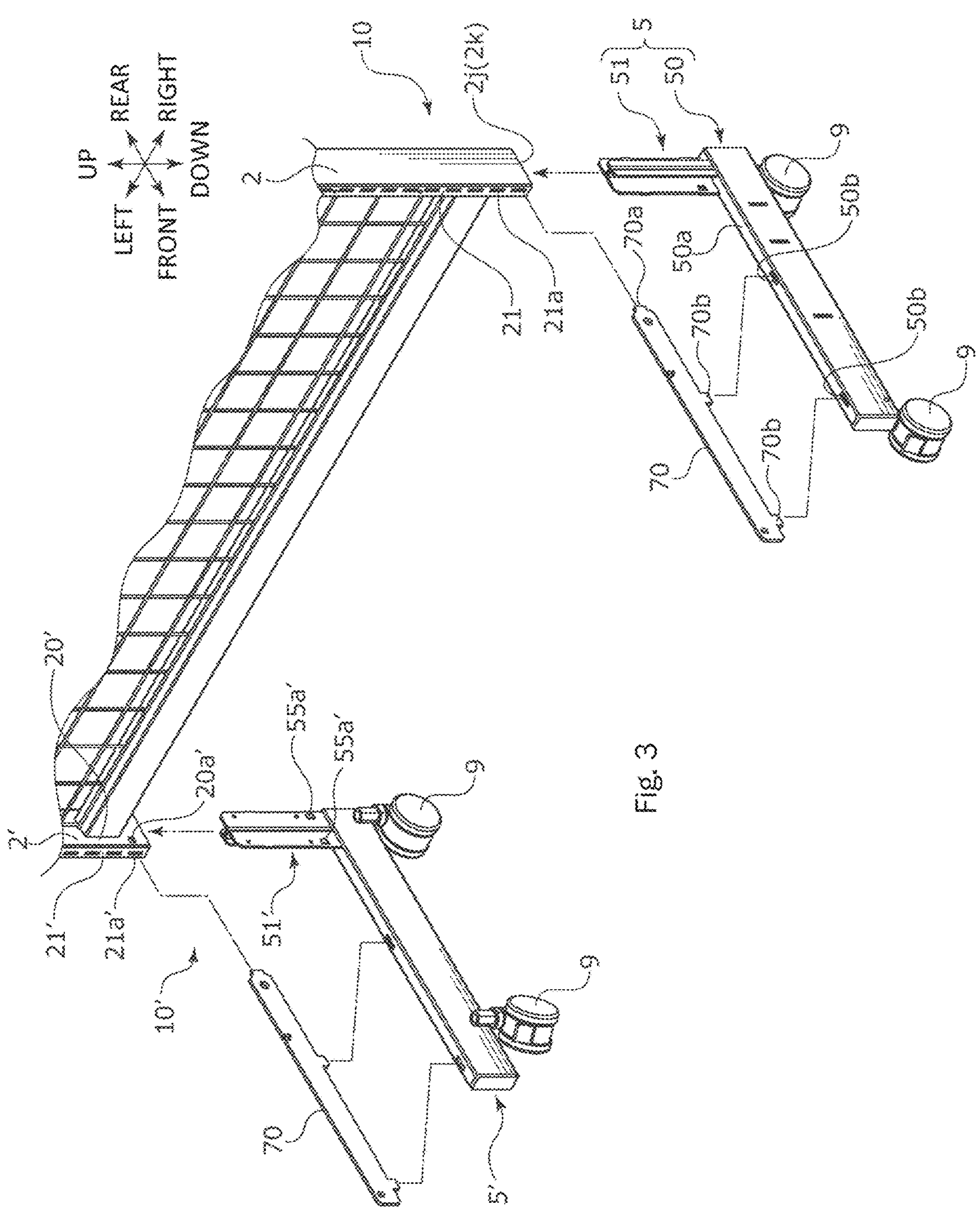
FIG. 3 is an exploded perspective view of the coupling structure in the first embodiment.

As illustrated in FIGS. 1 to 3, the shelf unit 7 provided at the lowermost stage includes a pair of right and left brackets 70, 70 and a shelf board 71 (see FIG. 1).

As illustrated in FIG. 3, a single rear piece 70*a* that projects to the rear side is provided in a rear end in the bracket 70. Also, two lower pieces 70*b*, 70*b* that project to the lower side are provided in a lower end in the bracket 70.

The rear piece 70*a* is inserted into the insertion hole 21*a* in the support post 2. The lower pieces 70*b*, 70*b* are inserted into slits 50*b*, 50*b* formed in the leg material 5.

Returning to FIG. 1, both right and left ends in the shelf board 71 are supported by the brackets 70, 70.

It is noted that the shelf boards 61, 71 are shelf boards having the same structure. Also, the shelf boards used in the shelf units may have different front-to-rear sizes, for example, or may be appropriately changed. Further, members supported by the brackets in the shelf units are not limited to the shelf boards, but may be net racks, may be boxes, or may be appropriately changed as long as items can be accommodated.

Next, with reference to FIGS. 3 to 9, the coupling structure 10 will be described.

Figure 4:
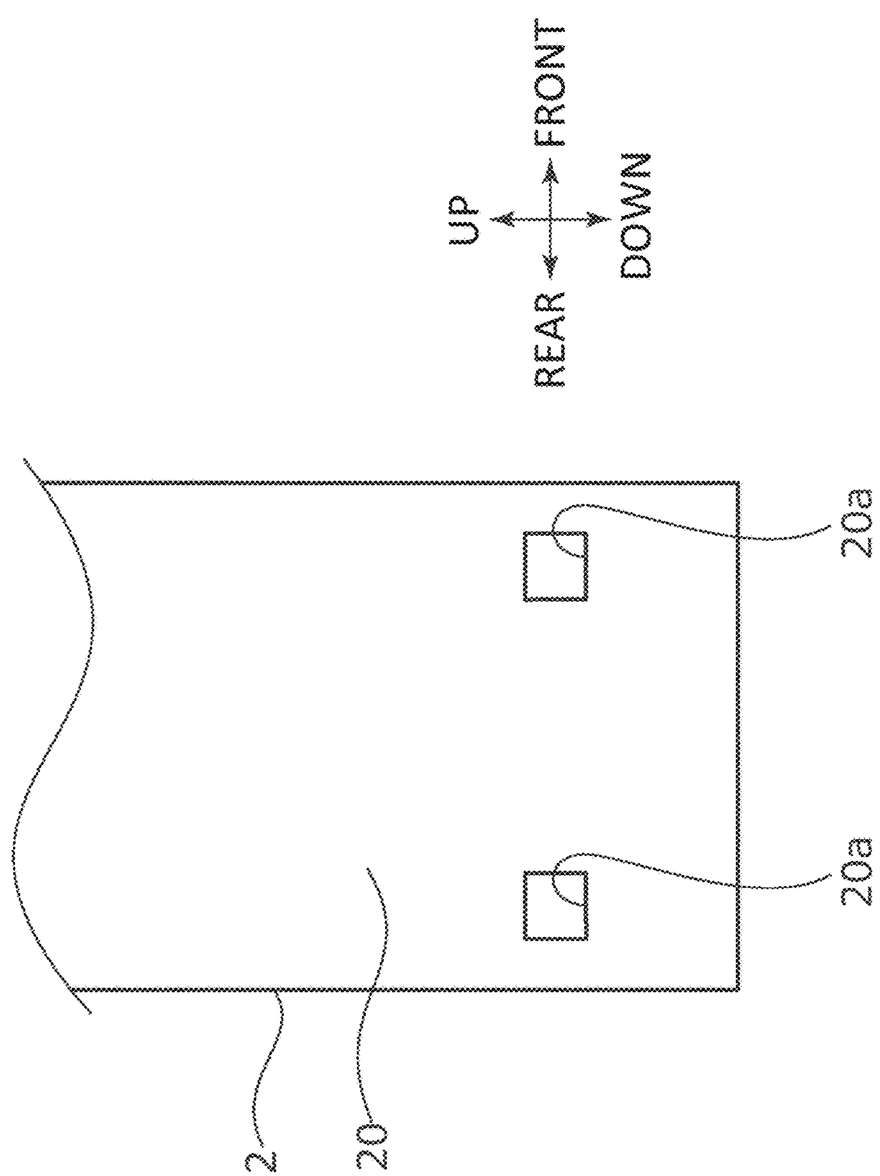
FIG. 4 is a left surface view of a support post major part in the first embodiment.

As illustrated in FIG. 4, two mated elements 20*a*, 20*a* serving as rectangular holes are formed in a lower end of the left side plate 20 in the support post 2 close to the front and rear sides. Positions of the mated elements 20*a*, 20*a* are matched so as to be mated with mating pieces 55*a*, 55*a* (see FIGS. 5 to 7) serving as cut and raised claws in an engagement element 51 to be described later.

As illustrated in FIG. 3, the leg material 5 includes a base element 50, and the engagement element 51.

Figure 9:
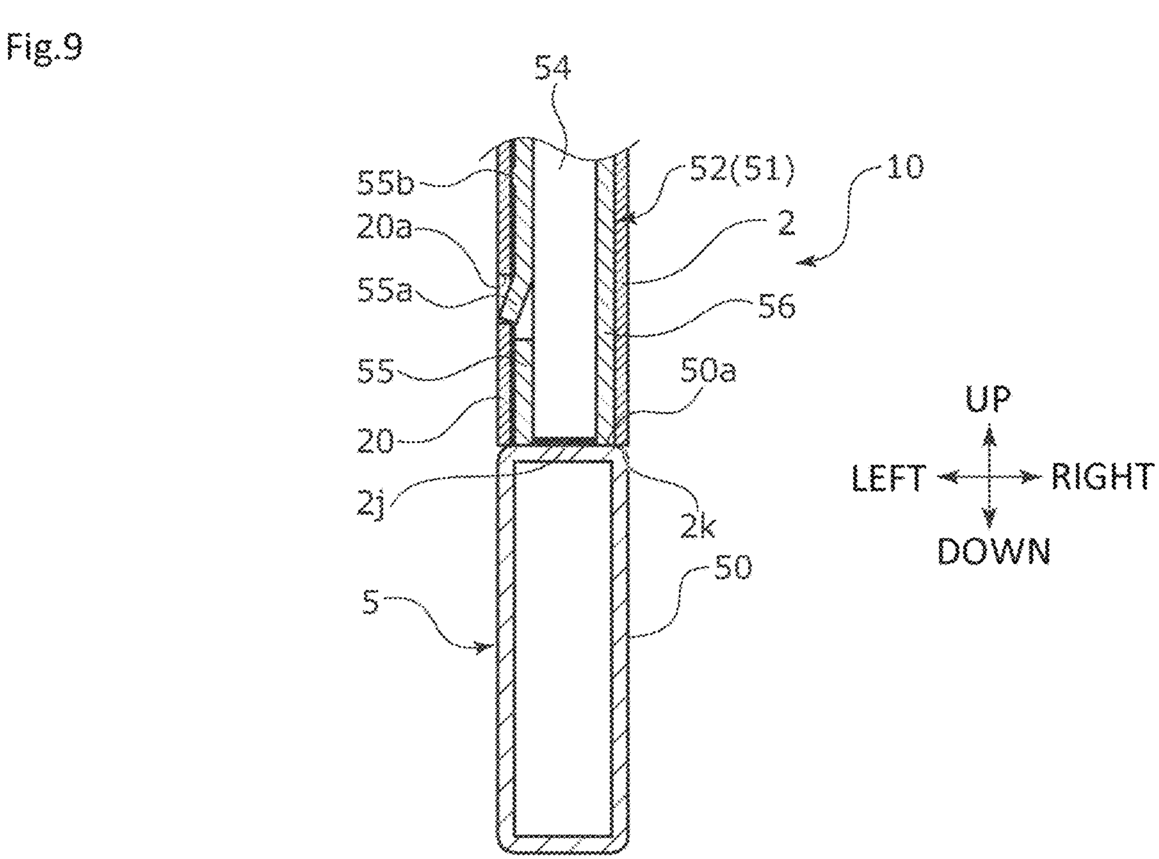
FIG. 9 is a front surface view illustrating a broken part of the coupling structure in the first embodiment.

The base element 50 is a square pipe made of metal and is formed in a hollow square cylinder shape extending in the front-to-rear direction (see FIG. 9). Also, two casters 9, 9 are fixed to the base element 50 so as to be rolled and moved.

Each one of the slits 50*b*, 50*b* is formed in center in the front-to-rear direction or a front end of an upper surface plate 50*a* in the base element 50.

Figures 5A, 5B:
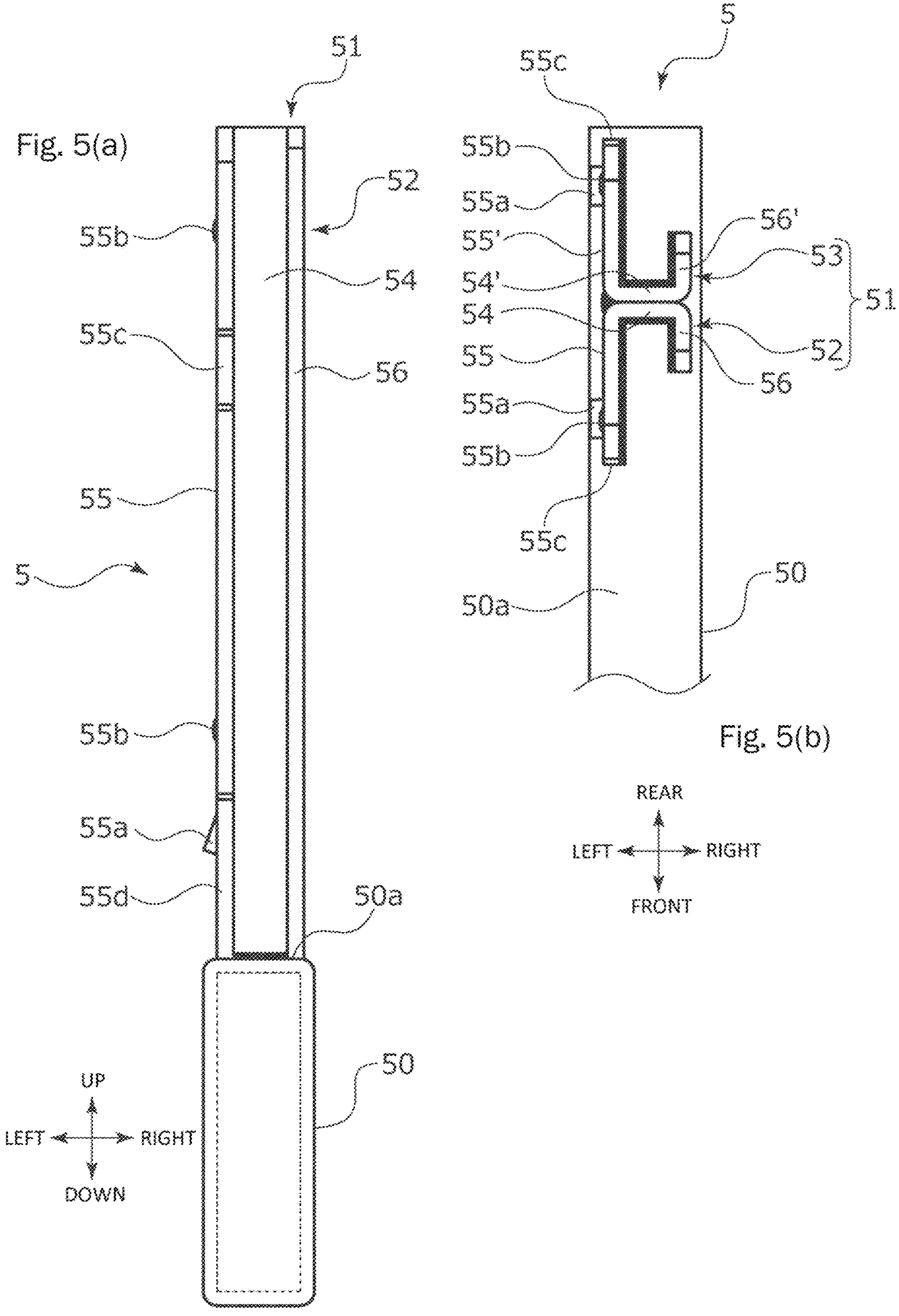
FIG. 5A is a front surface view of a leg material having an engagement element in the first embodiment.
FIG. 5B is an upper surface view of the engagement element in the first embodiment.
Figure 6:
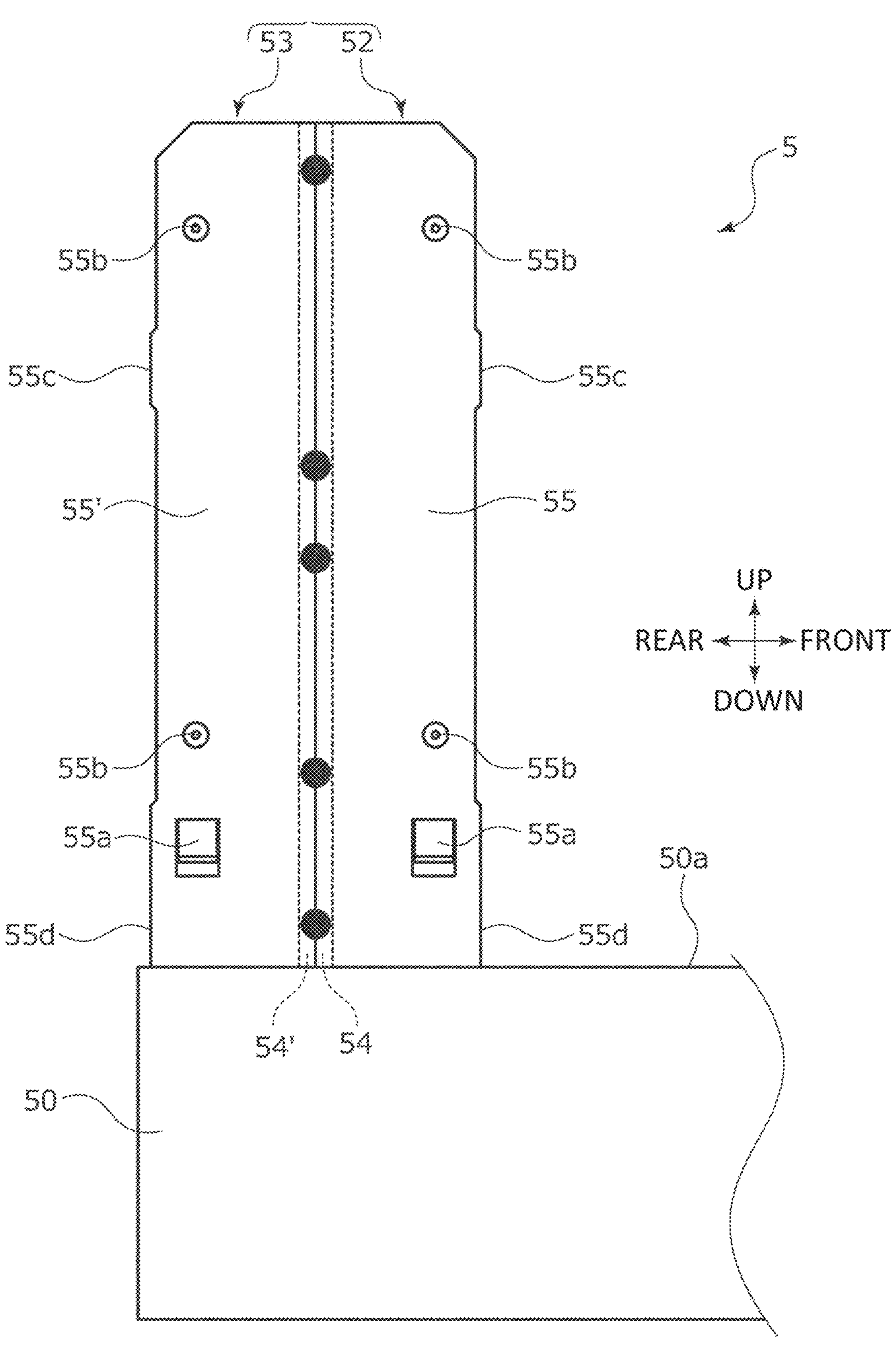
FIG. 6 is a left surface view of the engagement element in the first embodiment.
Figure 7:
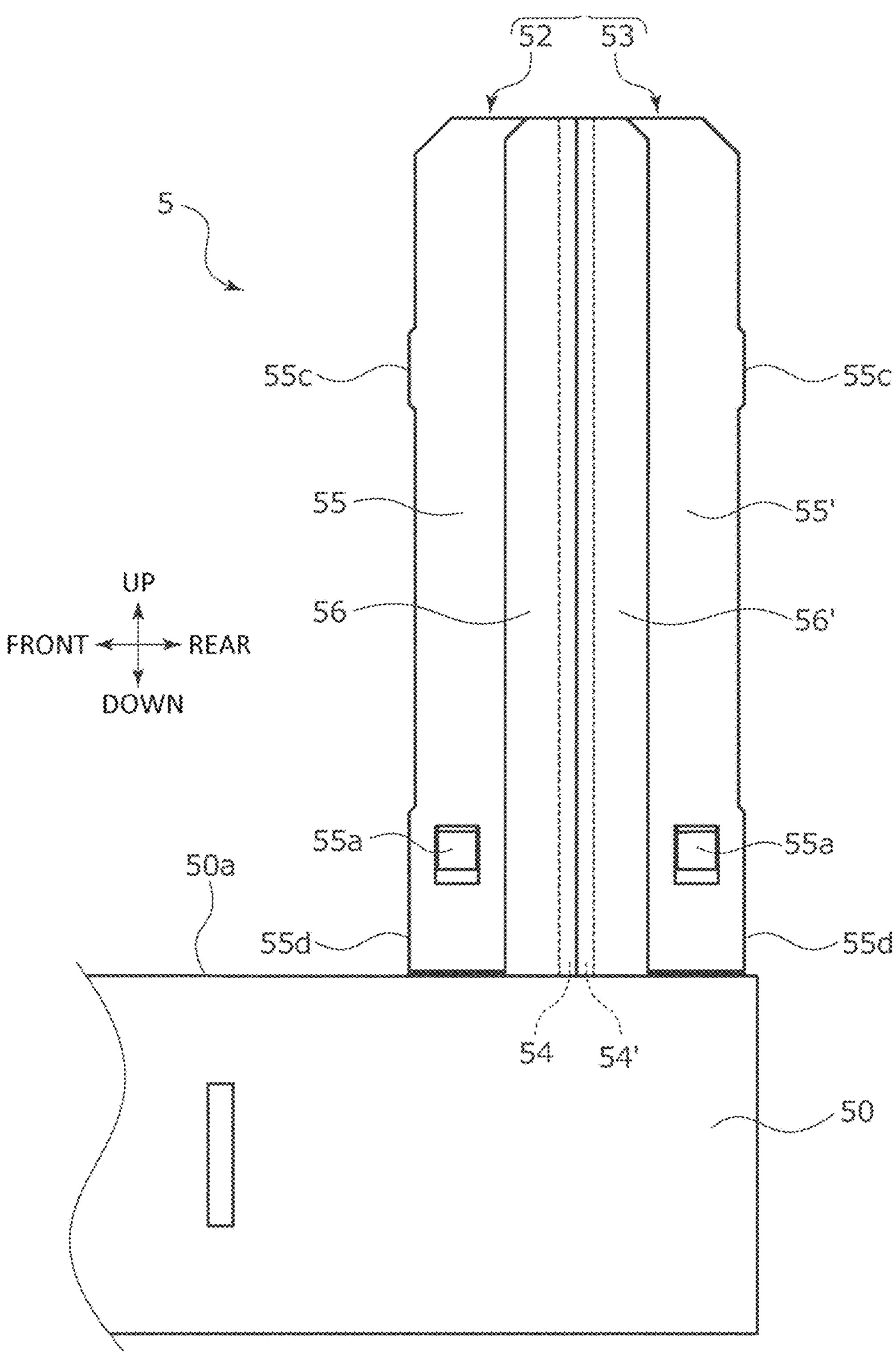
FIG. 7 is a right surface view of the engagement element in the first embodiment.

With reference to FIGS. 5 to 7, a lower end in the engagement element 51 is welded and fixed to a rear end of the upper surface plate 50*a* in the base element 50. It is noted that in FIGS. 5 to 9, welded points are illustrated by black bold lines.

The engagement element 51 is made of metal and formed in a long shape extending in the up and down direction, and long side plates 55, 55' to be described later are arranged on the left side which is the lateral coupling rod 3 side, and short side plates 56, 56' are arranged on the right side (see FIG. 5B).

In more detail, the engagement element 51 is formed by welding and fixing two constituent members 52, 53 to each other back to back.

The constituent member 52 and the constituent member 53 are formed in a symmetrical shape on the front and rear sides. The constituent member 52 is arranged on the front side. The constituent member 53 is arranged on the rear side. Thus, the constituent member 52 on the front side will be exemplified and described, and a duplicated description regarding the constituent member 53 on the rear side will be simplified or omitted.

With reference to FIG. 5, the constituent member 52 is a long item extending in the up and down direction, which is formed in an up-down reversed and right-left reversed J shape. The constituent member 52 has a flat plate-shaped intermediate plate 54 extending in the right and left direction, a flat plate-shaped long side plate 55 extending from the intermediate plate 54 in the front-to-rear direction, and a flat plate-shaped short side plate 56 extending from the intermediate plate 54 in the front-to-rear direction.

The outer side of a connection point of the long side plate 55 and the intermediate plate 54 is formed in a R shape.

With reference to FIGS. 5 and 6, on the lower side and the front side in the long side plate 55, the mating piece 55*a* that projects to the left side from a left surface thereof is formed.

The mating piece 55*a* is a rectangular piece cut and raised in a state where an upper end thereof continues to a main portion in the long side plate 55. That is, the mating piece 55*a* is in a state where the mating piece 55*a* is cantilevered by the main portion in the long side plate 55, and extends to the lower side while inclining leftward from the upper end thereof. The mating piece 55*a* is formed by pressing part of the main portion in the long side plate 55.

In the long side plate 55, two upper and lower projections 55*b*, 55*b* that project to the left side from the left surface in the main portion thereof are formed. Each projection 55*b* is formed in a semispherical shape. Also, the maximum projecting size of the projection 55*b* that projects to the left side from the main portion is shorter than the maximum projecting size of the mating piece 55*a* in a natural state (see FIG. 5A).

Parts of an upper end portion and a front end portion in the long side plate 55 are obliquely chamfered (see FIG. 6).

Also, in the long side plate 55, two upper and lower abutment elements 55*c*, 55*d* that project to the front side are formed in the front end portion thereof.

The abutment element 55*c* on the upper side is formed on the lower side of the chamfered part in the long side plate 55. An upper end and a lower end in the abutment element 55*c* on the upper side are obliquely chamfered.

The abutment element 55*d* on the lower side extends from the slightly upper side of the mating piece 55*a* to a lower end edge in the long side plate 55. An upper end in the abutment element 55*d* on the lower side is obliquely chamfered.

With reference to FIGS. 5 and 7, the short side plate 56 extends in substantially parallel to the long side plate 55. A size in the front-to-rear direction of the short side plate 56 is shorter than a size in the front-to-rear direction of the long side plate 55.

Parts of an upper end portion and a front end portion in the short side plate 56 are obliquely chamfered.

A front end in the short side plate 56 is positioned on the rear side of the mating piece 55*a* in the long side plate 55. Thereby, it is possible to insert the rear piece 70*a* in the bracket 70 into the insertion hole 21*a* in the support post 2 (see FIG. 8). Further, since it is possible to form the mating piece 55*a* while avoiding the short side plate 56, it is easy and convenient to form the mating piece 55*a*.

In the constituent member 52, the inner surface side in a lower end thereof is welded and fixed to the upper surface plate 50*a* in the base element 50. That is, the front side of the intermediate plate 54 is welded to the upper surface plate 50*a*. The right side of the long side plate 55 is welded to the upper surface plate 50*a*. The left side of the short side plate 56 is welded to the upper surface plate 50*a*.

Thereby, a bead generated by welding is prevented from coming out to the outer side of the constituent member 52 and contacting with the support post 2.

With reference to FIG. 8, in a state where the constituent member 52 is inserted into the support post 2, an open element 57 serving as a space that extends in the up and down direction is formed on the front side of the intermediate plate 54 and the short side plate 56.

Similarly, in a state where the constituent member 53 is inserted into the support post 2', an open element 57' serving as a space that extends in the up and down direction is formed on the rear side of the intermediate plate 54' and the short side plate 56'.

The constituent members 52, 53 are welded and fixed to each other in a state where the intermediate plate 54 in the constituent member 52 and the intermediate plate 54' in the constituent member 53 are placed back to back. Placing back to back indicates a state where a front end surface in the intermediate plate 54' and a rear end surface in the intermediate plate 54 are arranged to oppose each other and abutted with each other.

In more detail, with reference to FIG. 6, in the constituent members 52, 53, a rear end of the long side plate 55 in the constituent member 52 and a front end of the long side plate 55' in the constituent member 53 are welded and fixed to each other. By the four projections **55*b* in the long side plates 55, 55', the bead generated by welding is prevented from projecting to the outer side of the fourth projections 55*b* and contacting with the support post 2**.

Also, a butting point of the long side plate 55 and the long side plate 55' extends in the up and down direction and configures a groove shape that is open on the left side. Since a plurality of points in this groove-shaped part are welded, the bead is prevented from contacting with the support post 2. Also, by forming the welded points in a groove shape, it is possible to shorten the maximum projecting size of the projections **55*b*. It is noted that the welded points are not limited to a groove shape but may be formed in a recessed shape, may be formed in a hole shape, or may be formed in a shape recessed in the direction of separating from the left side plate 20 in the support post 2**.

It is noted that a method of fixing the constituent member 52 and the constituent member 53 is not limited to welding but may be screwing, may be engagement, or may be appropriately changed. Also, if the constituent member 52 and the constituent member 53 are separately fixed to the base element 50, the constituent member 52 and the constituent member 53 are not necessarily directly fixed to each other.

A position of a left surface of the long side plate 55' in the constituent member 53 is matched on the same plane as a left surface of the long side plate 55 in the constituent member 52.

A position of a right end surface of the short side plate 56' in the constituent member 53 is matched on the same plane as a right end surface of the short side plate 56 in the constituent member 52.

As illustrated in FIG. 8, the support post 2 and the leg material 5 are coupled to each other by fitting the engagement element 51 into the support post 2.

An outer size L1 in the right and left direction of the engagement element 51 is subtly longer than or the same as an inner size L2 in the right and left direction of the support post 2. The outer size L1 of the engagement element 51 is a size in the right and left direction from a left end surface of the projection **55*b* in the long side plate 55 (see FIG. 9) to the right end surface in the short side plate 56. Also, the inner size L2 of the support post 2 is a size in the right and left direction from an inner surface 2*m* of the left side plate 20 to an inner surface 2*g*** of the right side plate.

An outer size L3 in the front-to-rear direction of the engagement element 51 is subtly longer than or the same as an inner size L4 in the front-to-rear direction of the support post 2. The outer size L3 of the engagement element 51 is a size in the front-to-rear direction from a front end surface of the abutment element **55*d* in the constituent member 52 to a rear end surface of the abutment element 55*d* in the constituent member 53. Also, the inner size L4 of the support post 2 is a size in the front-to-rear direction from an inner surface 2*f* of the front surface plate 21 to an inner surface 2*r*** of a rear surface plate.

That is, the long side plates 55, 55' extend to corner elements **2*a*, 2*d* serving as corner portions on the inner side in the support post 2. Also, the short side plates 56, 56' are separated from corner elements 2*b*, 2*c* serving as corner portions on the inner side in the support post 2**.

It is noted that the corner element **2*a* is a part where the inner surface 2*m* of the left side plate 20 and the inner surface 2*r* of the rear surface plate cross each other. Also, the corner element 2*b* is a part where the inner surface 2*r* of the rear surface plate and the inner surface 2*g* of the right side plate cross each other. The corner element 2*c* is a part where the inner surface 2*g* of the right side plate and the inner surface 2*f* of the front surface plate 21 cross each other. The corner element 2*d* is a part where the inner surface 2*f* of the front surface plate 21 and the inner surface 2*m* of the left side plate 20** cross each other.

Next, a method of coupling the support post 2 and the leg material 5 will be described. It is noted that the support posts 2, 2', the lateral coupling rods 3, 3, and the back surface panel 4 are already configured into the panel body.

With reference to FIG. 3, first, the engagement element 51 in the leg material 5 is fitted into the support post 2 from an end opening **2*j* of a lower end in the support post 2. A size in the front-to-rear direction of parts among the long side plates 55, 55' in the engagement element 51, the parts being on the upper side of the abutment elements 55*c*, 55*c* on the upper side is shorter than the inner size L4 in the front-to-rear direction in the support post 2 (see FIG. 4). Thereby, insertion into the support post 2** becomes easy.

Also, the upper end portions of the long side plates 55, 55' are chamfered. Thus, by abutting the chamfered parts with a lower end edge **2*k* in the support post 2, guidance is made so that inclination with respect to the support post 2 becomes smaller. Thereby, the insertion into the support post 2 becomes furthermore easy. The lower end edge 2*k* is formed in a rectangular frame shape, and the end opening 2*j*** is formed on the inner side.

Also, by the four projections **55*b* formed in a semispherical shape, an area of the engagement element 51 contacting with a left inner surface in the support post 2 is reduced. Thereby, the engagement element 51 is more easily fitted into the support post 2**.

Also, in the engagement element 51, a size in the front-to-rear direction is shorter in the short side plates 56, 56' than in the long side plates 55, 55', and an area contacting with the right inner surface **2*g* in the support post 2 is reduced. Thereby, the engagement element 51 is more easily fitted into the support post 2**.

Further, the short side plates 56, 56' are separated from the corner elements **2*b*, 2*c* in the support post 2. Thus, an area contacting with the inner surface 2*f* of the front surface plate 21 and the inner surface 2*r* of the rear surface plate in the support post 2 is reduced. Thereby, the engagement element 51 is more easily fitted into the support post 2**.

When fitting of the engagement element 51 into the support post 2 progresses, and the chamfered parts of the abutment elements **55*c*, 55*c* on the upper side in the engagement element 51 are abutted with the lower end edge 2*k* in the support post 2, guidance is made so that the inclination of the engagement element 51 with respect to the support post 2** becomes smaller.

By abutting the chamfered parts of the abutment elements **55*d*, 55*d* on the lower side in the engagement element 51** with the lower end edge 2*k* in the support post 2, guidance is made so that the inclination of the engagement element 51 with respect to the support post 2 becomes further smaller.

Also, in the engagement element 51, by the four abutment elements 55*c*, 55*d*, . . . , an area contacting with the inner surface 2*f* of the front surface plate 21 and the inner surface 2*r* of the rear surface plate in the support post 2 is reduced. Thereby, the engagement element 51 is more easily fitted into the support post 2.

With reference to FIG. 9, after the chamfered parts of the abutment elements 55*d*, 55*d* on the lower side are fitted into the support post 2, the mating pieces 55*a*, 55*a* in the engagement element 51 are abutted with the lower end edge 2*k* in the support post 2. When the engagement element 51 is further fitted into the support post 2 from this state, the lower end sides of the mating pieces 55*a*, 55*a* are elastically deformed so as to be moved to the right side, and fitted into the support post 2. It is noted that in FIG. 9, the lateral coupling rod 3 is not illustrated.

When the engagement element 51 is further fitted into the support post 2, the mating pieces 55*a*, 55*a* are moved while in sliding contact with the left inner surface in the support post 2. Then, when reaching the corresponding mated elements 20*a*, 20*a*, the mating pieces 55*a*, 55*a* are elastically restored and engaged with the mated elements, 20*a*, 20*a*, and brought into a state shown in FIG. 9. Thereby, the fitting of the engagement element 51 into the support post 2 is completed, and the leg material 5 and the support post 2 are coupled to each other.

Also, by abutting the upper surface plate 50*a* in the base element 50 with the lower end edge 2*k* in the support post 2, further fitting of the engagement element 51 into the support post 2 is regulated. That is, the engagement element 51 is prevented from further moving to the upper side and the mating pieces 55*a*, 55*a* are prevented from getting out from the mated elements 20*a*, 20*a*.

Also, when the leg material 5 is to be moved from the support post 2 to the lower side, lower ends of the mating pieces 55*a*, 55*a* in the engagement element 51 are abutted with edges that define the mated elements 20*a*, 20*a*. That is, the engagement element 51 is prevented from getting out from the mated elements 20*a*, 20*a*.

Meanwhile, by pressing the mating pieces 55*a*, 55*a* engaged with the mated elements 20*a*, 20*a* to the right side by a jig, etc., and elastically deforming, it is possible to cancel a mated state of the engagement element 51. While in this state, by moving the engagement element 51 to the lower side with respect to the support post 2, it is possible to easily and conveniently draw the engagement element 51 out from the support post 2.

Since being the same as the coupling structure 10 described above, a description of the coupling structure 10' of the support post 2' and the leg material 5' will be simplified.

With reference to FIG. 3, upon coupling the support post 2' and the leg material 5', an engagement element 51' in the leg material 5' is fitted into the support post 2'. Also, by mating pieces 55*a'*, 55*a'* in the engagement element 51' with mated elements 20*a'*, 20*a'* of the right side plate 20' in the support post 2', the support post 2' and the leg material 5' are coupled to each other.

As described above, in the coupling structures 10, 10' of the first embodiment, it is possible to couple the support posts 2, 2' and the leg materials 5, 5' by an easy and convenient method of fitting the engagement elements 51, 51' in the leg materials 5, 5' into the support posts 2, 2'.

Also, as illustrated in FIG. 8, in the coupling structure 10, the insertion hole 21*a* is provided at a position close to the short side plate 56 rather than the long side plate 55 in the front surface plate 21 of the support post 2.

Thereby, in a state where the rear piece 70*a* in the bracket 70 is inserted into the insertion hole 21*a*, part of the rear piece 70*a* is positioned in the hollow open element 57 defined by the support post 2 and the constituent member 52, and the rear piece 70*a* is prevented from contacting with the engagement element 51. From this, it is possible to insert and remove the rear piece 70*a* through the insertion hole 21*a*.

It is noted that the shelf unit 7 at the lowermost stage can also be replaced with the structure of the shelf unit 6. In this case, in FIG. 8, not the bracket 70 and the rear piece 70*a* but the bracket 60 and the hook 60*a* that are indicated by "(60) and (60*a*)" in parentheses are illustrated.

Also, in the coupling structure 10, the outer size L3 in the front-to-rear direction in the engagement element 51, which is the sum of the long side plates 55, 55', and the inner size L4 in the front-to-rear direction in the support post 2 can be substantially the same as each other.

Also, the engagement element 51 has the long side plate 55 and the short side plate 56 arranged to oppose each other across a space. In addition, the short side plate 56 is arranged at a position near the insertion hole 21*a* rather than the long side plate 55 in the right and left direction.

Thereby, the short side plate 56 of the engagement element 51 less easily contacts with the rear piece 70*a* in the bracket 70 inserted into the insertion hole 21*a*. Therefore, insertion and removal of the rear piece 70*a* through the insertion hole 21*a* become easier and more convenient. Further, by arranging the short side plate 56 at the position near the insertion hole 21*a*, it is possible to shorten the outer size L1 in the right and left direction in the engagement element 51 and the inner size L2 in the right and left direction in the support post 2. In addition, since the insertion hole 21*a* is provided on the slightly right side of the front surface plate 21 and the short side plate 56 is also provided on the right side, the operations and the effects described above are furthermore remarkable.

Also, in the engagement element 51, since the constituent members 52, 53 respectively have a J-shaped sectional shape, a structural strength is high.

Also, the engagement element 51 is formed by fixing the intermediate plates 54, 54' in the two constituent members 52, 53 having a J-shaped sectional shape to each other back to back. Thereby, it is possible not only to make manufacture of the engagement element 51 easy and convenient, but also enhance the structural strength. It is noted that although the example in which the engagement element 51 is configured by the two constituent members 52, 53 is described, the engagement element 51 may be configured by a single constituent member and have substantially the same sectional shape as the present embodiment.

Further, in the leg material 5, since the engagement element 51 formed by welding the two constituent members 52, 53 to each other is welded and fixed to the base element 50, the manufacture becomes easy and convenient.

Also, in the engagement element 51, the abutment element 55*d* on the lower side, which is positioned on the foremost side and the abutment element 55*d* on the lower side, which is positioned on the rearmost side are respectively welded to the base element 50, and a coupling strength with respect to the base element 50 is enhanced. From this, even when a force that oscillates in the front-to-rear direction on the engagement element 51 as a base point acts on the support post 2, it is possible to stably hold a standing state of the support post 2.

Also, the example in which the abutment element 55*c* on the upper side and the abutment element 55*d* on the lower side are provided in the engagement element 51 is described. However, the number of the abutment elements that project in the front-to-rear direction may be one, three, or more except for two in the up and down direction.

Also, the mating pieces 55*a*, 55*a* are provided in the vicinity of the corner element 2*a* or in the vicinity of the corner element 2*d* in the support post 2. Thereby, in a state where the support post 2 and the engagement element 51 are coupled to each other, it is possible to reduce an angle of the inclination of the engagement element 51 with respect to the support post 2. The same applies to a case where the abutment elements 55*d*, 55*d* on the lower side are subtly separated from the corner element 2*a* or the corner element 2*d* in the support post 2.

Also, in the assembly type fixture 1 including the coupling structure 10 of the present embodiment, it is possible to couple the support post 2 and the leg material 5 by the easy and convenient method of fitting the engagement element 51 in the leg material 5 into the support post 2.

Also, as illustrated in FIG. 8, in a state where the rear piece 70*a* in the bracket 70 is inserted into the insertion hole 21*a*, part of the rear piece 70*a* is inserted into the open element 57. That is, the rear piece 70*a* is prevented from contacting with the engagement element 51. From this, it is possible to insert and remove the rear piece 70*a* through the insertion hole 21*a*.

Also, with reference to FIG. 2, the mated elements 20*a*', 20*a*' in the support post 2' are open toward the center side in the right and left direction in the assembly type fixture 1. The same applies to the mated elements 20*a*, 20*a* in the support post 2, which are formed in a symmetrical shape. Thereby, the mated elements 20*a*, 20*a*', . . . and the mating pieces 55*a*, 55*a*', . . . are less easily visually recognized, and an esthetic property of the assembly type fixture 1 is enhanced.

Also, the mated elements 20*a*', 20*a*' in the support post 2' are formed in the lower end in the support post 2'. The same applies to the mated elements 20*a*, 20*a* in the support post 2, which are formed in a symmetrical shape. From this, the mated elements 20*a*, 20*a*', . . . and the mating pieces 55*a*, 55*a*', . . . are less easily visually recognized by the shelf units 6, 6 provided on the upper side in the support post 2 (see FIG. 1).

Also, the mated elements 20*a*', 20*a*' in the support post 2' are formed at substantially the same positions in the up and down direction as the insertion hole 21*a*' onto which the rear piece 70*a* in the bracket 70 at the lowermost stage is locked. The same applies to the mated elements 20*a*, 20*a* in the support post 2, which are formed in a symmetrical shape. From this, the mated elements 20*a*, 20*a*', . . . and the mating pieces 55*a*, 55*a*', . . . are less easily visually recognized by the shelf unit 7 provided at the lowermost stage (see FIG. 1).

Also, by bringing the assembly type fixture 1 into a state where the support posts 2, 2', the lateral coupling rods 3, 3, and the back surface panel 4 already configure the panel body at the time of shipping, assembling is completed only by coupling the leg materials 5, 5' to the support posts 2, 2'. Thus, assembling is easy and convenient.

Second Embodiment

Next, an assembly type fixture including a coupling structure according to a second embodiment of the present invention will be described with reference to FIGS. 10 and 11. It is noted that a description of the same and duplicated configurations as the first embodiment will be omitted.

Figure 10:
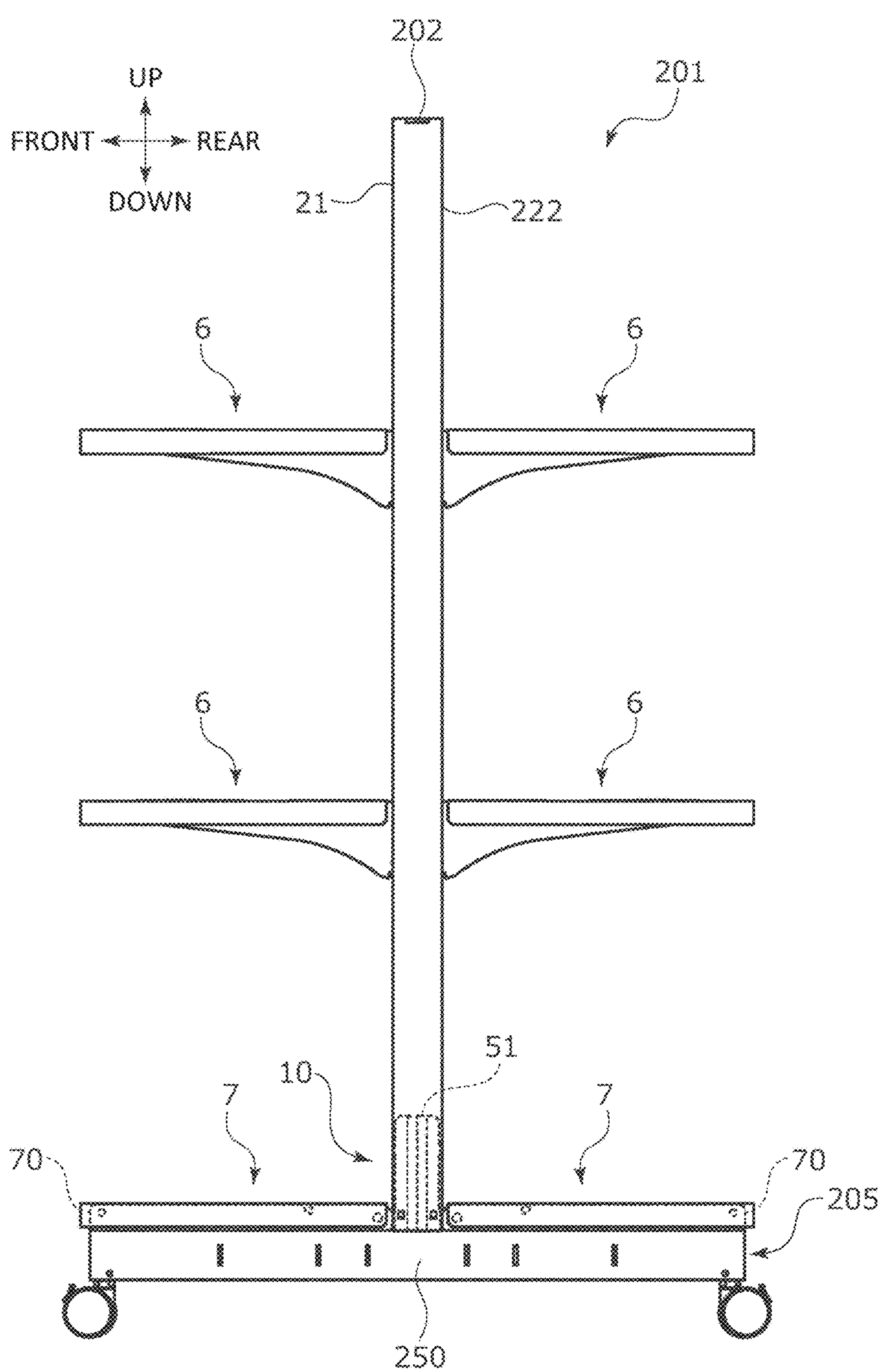
FIG. 10 is a side surface view of an assembly type fixture in a second embodiment according to the present invention.
Figure 11:
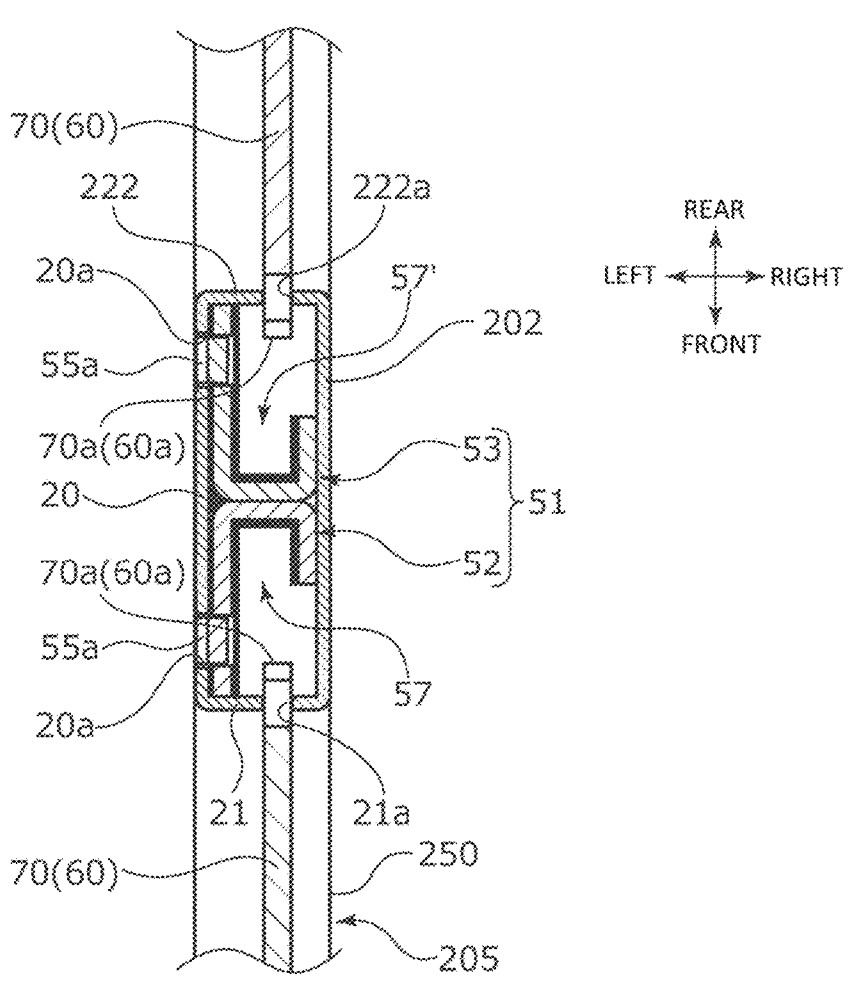
FIG. 11 is an upper surface view illustrating a broken part of a coupling structure in the second embodiment.

With reference to FIGS. 10 and 11, in an assembly type fixture 201 including a coupling structure 10 in the second embodiment, in addition to a front surface plate 21 in a support post 202, a plurality of insertion holes 222*a*, 2 22*a*, . . . are also formed in a rear surface plate 222. That is, it is possible to attach shelf units 6, 6, 7 not only on the front side but also on the rear side in the support post 202 (see FIG. 10).

In a leg material 205 coupled to the support post 202, an engagement element 51 is welded and fixed to center in the front-to-rear direction in a base element 250. In this way, a position where the engagement element is fixed to the base element may be appropriately changed.

As illustrated in FIG. 11, a rear piece 70*a* in a bracket 70 inserted into the insertion hole 222*a* in the rear surface plate 222 is inserted into an open element 57'. That is, it is possible to prevent the rear piece 70*a* from contacting with the engagement element 51.

The embodiments of the present invention are described above based on the drawings. However, specific configurations are not limited to these embodiments and the present invention includes additions and changes within a range not departing from the scope of the present invention.

For example, in the first and second embodiments described above, the configuration in which the square pipe is the support post and the coupling member is the leg material is described. However, the present invention is not limited to this but the square pipe may be the support post and the coupling member may be the lateral coupling rod, the square pipe may be the leg material and the coupling member may be a kickplate, or the configuration may be appropriately changed. It is noted that the kickplate described here is a member to be bridged from a front end in the leg material on the left side to a front end in the leg material on the right side.

In addition, when the square pipe is the leg material and the coupling member is the kickplate having an engagement element fitted in from a leading end opening of the leg material, a slit provided in an upper surface plate in the leg material serves as an insertion hole of the present invention.

Also, in the first and second embodiments described above, the configuration in which the hook or the rear piece in the bracket that is another member is inserted into the insertion hole is described. However, the present invention is not limited to this but a configuration in which part of a brace is inserted may be available, a configuration in which part of an anti-drop member is inserted may be available, or the configuration may be appropriately changed.

Also, in the first and second embodiments described above, the configuration in which the engagement element is welded and fixed to the base element is described. However, the present invention is not limited to this but the engagement element may be screwed or may be engaged, or the method of fixing may be appropriately changed. It is noted that in order to simplify assembling of the assembly type fixture on site, it is preferable to fix the engagement element to the base element at the time of shipping in any methods of fixing including welding.

Also, in the first embodiment described above, the configuration in which the mated element is a through hole is described. However, the present invention is not limited to this but the mated element may be a recessed portion, may be a stepped portion, or may be appropriately changed.

What is claimed is:

1. An assembly type fixture, comprising:

a square pipe having an insertion hole at least in a front surface plate of the square pipe; and a coupling member having an engagement element that is inserted into the square pipe from an end opening of the square pipe, wherein the engagement element has a long side plate and a short side plate that oppose each other and have different front-to-rear lengths from each other, and an intermediate plate that connects the long side plate and the short side plate throughout length thereof in an insertion direction of the engagement element, the engagement element is abutted with and arranged on an inner surface of the square pipe, and the insertion hole is arranged close to the short side plate side.

2. The assembly type fixture according to claim 1, wherein the engagement element is abutted with at least one of a front inner surface and a rear inner surface of the square pipe.

3. The assembly type fixture according to claim 1, wherein the engagement element is formed by fixing two constituent members each formed in a J-shape in a sectional view to each other back to back.

4. The assembly type fixture according to claim 1, wherein the engagement element has a mating piece that projects to a square pipe side, and the square pipe has a mated element with which the mating element is mated.

5. The assembly type fixture according to claim 4, wherein the mating piece is provided at a position corresponding to a corner of the square pipe.

6. The assembly type fixture according to claim 2, wherein the engagement element has a mating piece that projects to a square pipe side, and the square pipe has a mated element with which the mating piece is mated.

7. The assembly type fixture according to claim 6, wherein the mating piece is provided at a position corresponding to a corner of the square pipe.

8. The assembly type fixture according to claim 3, wherein the engagement element has a mating piece that projects to a square pipe side, and the square pipe has a mated element with which the mating element is mated.

9. The assembly type fixture according to claim 8, wherein the mating piece is provided at a position corresponding to a corner of the square pipe.

10. An assembling part of an assembly type fixture, comprising:

a coupling member having an engagement element to be inserted into a square pipe from an end opening of the square pipe having an insertion hole at least in a front surface plate of the square pipe, wherein the engagement element has a long side plate and a short side plate to be abutted with an inner surface of the square pipe and an intermediate plate that connects the long side plate and the short side plate throughout length thereof in an insertion direction of the engagement element, and the long side plate and the short side plate oppose each other and have different front-to-rear lengths from each other, wherein the engagement element is formed by fixing two constituent members each formed in a J-shape in a sectional view to each other back to back.

11. The assembling part of the assembly type fixture according to claim 10, wherein the engagement element has a mating piece that projects to an outer side.

* * * * *